(12) United States Patent
Herter et al.

(10) Patent No.: US 9,872,366 B2
(45) Date of Patent: Jan. 16, 2018

(54) METHOD FOR CONTROLLING AN OPERATING DEVICE FOR LIGHTING MEANS

(71) Applicant: TRIDONIC GMBH & CO KG, Dornbirn (AT)

(72) Inventors: Jens Herter, Lindau (DE); John Kears, Durham (GB)

(73) Assignee: TRIDONIC GMBH & CO KG (AT)

( * ) Notice: Subject to any disclaimer, the term of this patent is extended or adjusted under 35 U.S.C. 154(b) by 0 days.

(21) Appl. No.: 15/514,869

(22) PCT Filed: Oct. 23, 2015

(86) PCT No.: PCT/AT2015/050268
§ 371 (c)(1),
(2) Date: Mar. 28, 2017

(87) PCT Pub. No.: WO2016/065382
PCT Pub. Date: May 6, 2016

(65) Prior Publication Data
US 2017/0231065 A1    Aug. 10, 2017

(30) Foreign Application Priority Data
Oct. 30, 2014 (AT) ................ GM383-2014

(51) Int. Cl.
*H05B 33/08* (2006.01)
*H05B 37/02* (2006.01)
(Continued)

(52) U.S. Cl.
CPC ......... *H05B 37/0254* (2013.01); *G06F 12/02* (2013.01); *H04L 61/2007* (2013.01);
(Continued)

(58) Field of Classification Search
CPC ............... H05B 37/02; H05B 37/0254; H05B 37/0263; H05B 37/0272; H05B 33/08;
(Continued)

(56) References Cited

U.S. PATENT DOCUMENTS 9,035,568 B2 * 5/2015 Ganton .............. H05B 33/0857
315/216
2013/0264971 A1   10/2013 Yeh et al.
(Continued)

FOREIGN PATENT DOCUMENTS

DE    102005028206    12/2006
EP       2490509       8/2012
(Continued)

OTHER PUBLICATIONS

Austria search report in priority Austria application GM 383/2014 dated Oct. 5, 2015.
(Continued)

*Primary Examiner* — Jimmy Vu
(74) *Attorney, Agent, or Firm* — Andrus Intellectual Property Law, LLP

(57) ABSTRACT

The invention relates to an illumination system (A) having at least one operating device (1) for operating lighting means, having a control device (10) which is connected by means of an analogue or digital light control bus to the operating device and is designed for transmission of analogue or digital control commands via the light control bus, wherein the control device (1) is designed to control the operating devices (1) in terms of brightness and/or color by means of control commands, wherein furthermore the control device is connected to a IPv6 bus system, the control device (10) is designed to receive IPv6 bus commands via the IPv6 bus system and is designed to transmit a colour command or a brightness command as control command,
(Continued)

according to the received IPv6 bus commands, to at least one operating device, and the operating device is designed to adapt the control of the lighting means according to the received colour command or brightness command.

20 Claims, 2 Drawing Sheets

(51) Int. Cl.
    *H04L 29/12*     (2006.01)
    *G06F 12/02*     (2006.01)
    *H04Q 3/54*     (2006.01)

(52) U.S. Cl.
    CPC ........... *H04L 61/2038* (2013.01); *H04Q 3/54* (2013.01); *H05B 33/0845* (2013.01); *H05B 37/0263* (2013.01); *H05B 37/0272* (2013.01)

(58) Field of Classification Search
    CPC ............ H05B 33/0818; H05B 33/0833; H05B 33/0845; H04L 61/2007; H04L 61/2038; H04Q 3/54
    USPC ..... 315/291, 294, 297, 307, 308, 312; 700/9, 700/17–20, 83
    See application file for complete search history.

(56) References Cited

U.S. PATENT DOCUMENTS

| | | | |
|---|---|---|---|
| 2013/0285574 A1* | 10/2013 | Garcia Morchon | ........... H05B 37/0245 315/297 |
| 2013/0289750 A1 | 10/2013 | Souvay et al. | |
| 2013/0293113 A1 | 11/2013 | Morrow | |

FOREIGN PATENT DOCUMENTS

| | | |
|---|---|---|
| WO | 2006033062 | 3/2006 |
| WO | 2009100762 | 8/2009 |

OTHER PUBLICATIONS

PCT International Search Report in parent application PCT/AT2015/050268 dated Jan. 15, 2016.

\* cited by examiner

METHOD FOR CONTROLLING AN OPERATING DEVICE FOR LIGHTING MEANS

CROSS REFERENCE TO RELATED APPLICATION

The present application is the U.S. national stage application of International Application PCT/AT2015/050268, filed Oct. 23, 2015, which international application was published on May 6, 2016 as International Publication WO 2016/065382 A1. The International Application claims priority to Austria Patent Application GM383-2014, filed Oct. 30, 2014.

FIELD OF THE INVENTION

The invention relates to a method for controlling at least one light operating device, a lighting system having a control device and at least one operating device for operating lighting means, and a control device for operating lighting means having an interface circuit for receiving digital control commands via a bus line.

BACKGROUND OF THE INVENTION

The area central control unit can be used for controlling operating devices for lighting means (sources), and are used in lighting systems for switching lighting means on and off and for setting the brightness. Normally, the lighting means are controlled by operating devices. The operating devices are combined to form groups and can be controlled by one or more central control units. The term lighting means refers to both gas discharge lamps as well as halogen lamps or light emitting diodes (LEDs). The lighting means can be disposed individually or collectively with other lighting means in a lamp, which can also contain the operating device.

With modern lighting systems, analog or digital control commands are frequently transmitted to the operating device by the central control unit. In particular, brightness values can be indicated by these external control commands in order to obtain various lighting states.

An analog control command can be a control voltage, for example, that can be modulated in terms of the amplitude.

The operating devices can be provided with an address in order to enable individual or group control by the central control unit.

A widely used control method is to control lighting systems according to the DALI (Digital Addressable Lighting Interface) standard. This standard defines an interface and a transmission format for digital control of operating devices, wherein addresses can be assigned to the individual operating devices. The operating devices can be switched on and off or controlled in terms of brightness via the external control commands. Furthermore, a special operating condition such as an emergency lighting state can be initiated, and error messages can be retrieved.

The DALI standard is a 16 bit Manchester code, which enables a maximum dimming speed of just 0.7 seconds in a brightness change of 1% to 100%. The maximum level lies in a range of approximately 16V, the minimum level is at a voltage of approximately 0 volts.

SUMMARY OF THE INVENTION

The object of the invention is to create a method that enables control of operating devices by a control unit without the disadvantages specified above, or with a significant reduction of these disadvantages.

The solution according to the invention for controlling operating devices is based on the concept that a control device is connected to the operating device via an analog or digital light control bus, and is configured to transmit analog or digital control commands via the light control bus. The control device is configured to control the operating devices in terms of brightness and/or color via the control commands. The control device is furthermore connected to an IPv6 bus system, and configured to receive IPv6 bus commands via the IPv6 bus system. The control device is further configured to transmit a color command or a brightness command to at least one operating device as a control command corresponding to the received IPv6 bus command. The operating device is configured to adjust the control of the lighting means in accordance with the received color command or brightness command.

In this manner, it is possible to incorporate already existing operating devices that have an interface device in a lighting system, and to simultaneously connect the lighting system to an IPv6 bus system. The interfaces do not have to be adapted to the individual operating devices at the IPv6 bus system, but rather, only a single central control device that can be connected to an IPv6 bus system needs to be adapted for this.

The control commands can be transmitted in a nested form in IPv6 bus commands. The control device can evaluate the IPv6 bus commands and forward the control commands contained therein to the bus line.

A control command according to the invention is not only a switching on or off command, or a new brightness value that can be transmitted to an operating device, but rather, it can also contain further information. In particular, color data, or a color command, an address, status information, or an error signal can be transmitted as a control command.

The control device can be configured to provide the voltage supply for the analog or digital light control bus 21, preferably supplied from the IPv6 bus system.

The control device can be designed to interrupt the voltage supply for the analog or digital light control bus.

The control device can disengage the operating devices from the network when it has been detected that all of the operating devices connected to the bus line have been switched off.

The invention also relates to a device for receiving control commands by an operating device for lighting means. The operating device has a drive circuit for operating the lighting means. The operating device has an interface circuit for receiving and evaluating the control commands.

The operating device can control the operation, the brightness and the color of the lighting means via the drive circuit in accordance with the received control commands.

The invention shall be explained below in greater detail based on the attached drawings.

DETAILED DESCRIPTION

Figure 1:
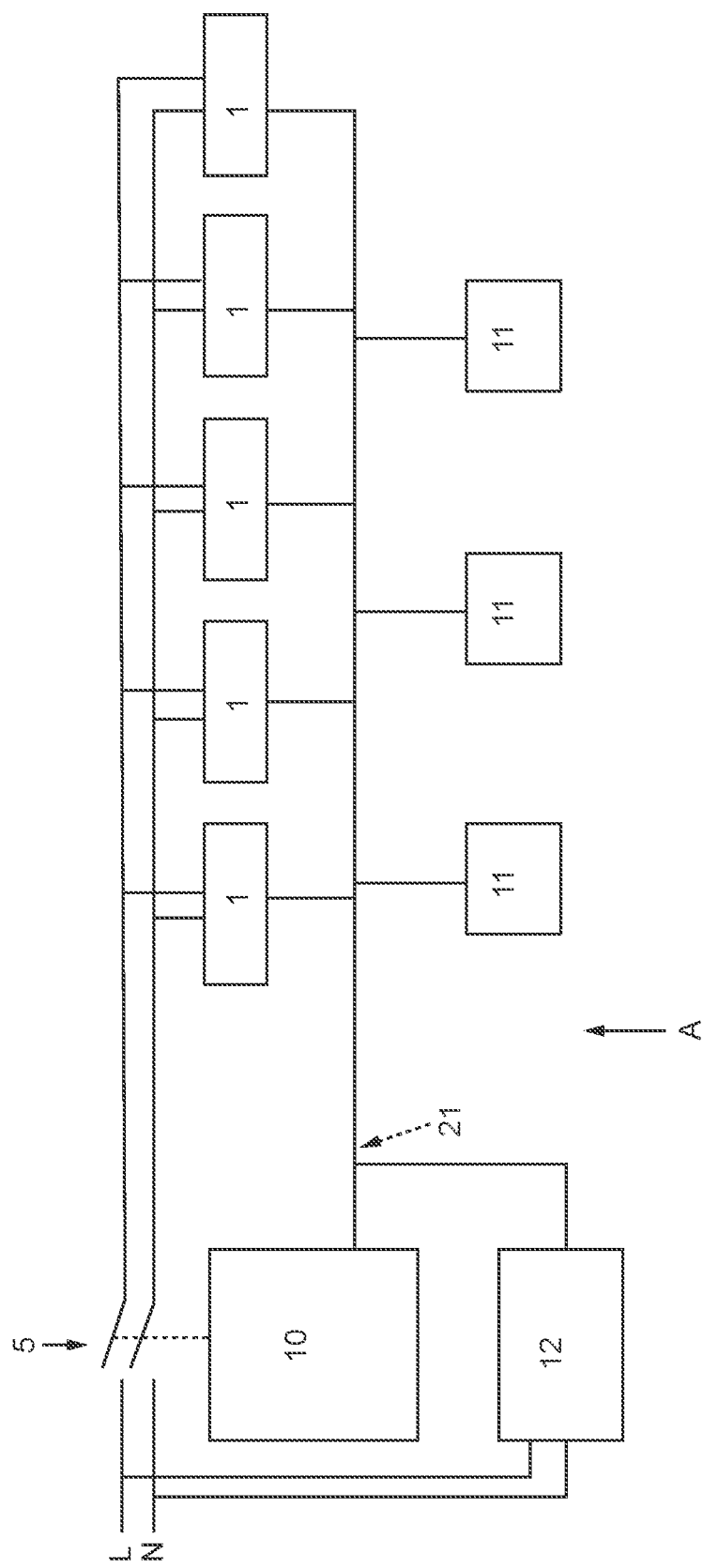
FIG. 1 shows, schematically, the design of a lighting system having a control device according to the invention.

The invention shall be explained below based on an exemplary embodiment of a lighting system having a control device according to the invention, and operating devices controlled with commands via the control device, and further actuator control devices.

The present invention can be used with operating devices for many types of lighting sources. It is possible to use different types of lighting means, and in particular, gas discharge lamps, halogen lamps, or inorganic or organic light emitting diodes, can be used.

The operating device 1 and the control device 10 are components of a lighting system A.

Other actuator control devices 11 can be connected to the analog or digital bus line 21. The bus line 21 can be an analog bus, such as a 1-10V control bus, or a digital control bus, such as a DALI or DSI bus, for example.

The various actuator control devices 11 are referred to as actuators, and can be connected to various sensors, such as movement or brightness sensors, for example, but can also be actuators that can be controlled by a user, e.g. switches, buttons or touchscreens having a user interface for lighting control.

The bus line 21 is preferably designed as a two-wire data line, which transmits a digital signal or analog signal having a low direct voltage as a control command. By way of example, data transfer is transmitted via the bus line 21 in accordance with the DALI standard. The interface circuit 4 and the control device 10 are able to receive, in particular, control commands in accordance with the DALI standard.

It should be noted that the data transfer of the control commands via the bus line 21 does not have to occur by means of a wired connection, but rather, it can alternatively be transmitted in a wireless manner, via a radio connection or via a power line communication (PLC) via the current supply network 20. Standardized transmission methods, analogous to the DALI standard for wire-connected data transfer, exist for each of the specified transmission variations, wherein, in accordance with the method according to the invention, a modified data transfer can occur via the same bus line 21.

The control device 10 can control individual or numerous light operating devices 1 via the bus line 21, and it can receive and transmit digital or analog control commands.

Thus, a method for controlling a lighting system A is created, having a bus line 21, in particular an analog or digital light control bus, to which at least one operating device for lighting means and at least one control device 10 is attached, wherein the operating device 1 is controlled in terms of brightness and/or color via the control commands, and wherein the control device is connected to an IPv6 bus system, the method comprising the following steps:

receiving IPv6 bus commands via the IPv6 bus system,
converting the received IPv6 bus commands in the control device 10,
transmitting a color command or brightness command to at least one operating device 1 as a control command by the control device 10,
adjusting of the control of the lighting means by the operating device 1 in accordance with the received color command or brightness command.

The conversion of the received IPv6 bus commands occurs in the control device 10. Subsequently, the control device 10 transmits a color command or brightness command as a control command to at least one operating device 1, which occurs on the basis of the at least one converted IPv6 bus command.

The IPv6 bus system can form a packet switching network for operating data packets. The IPv6 bus system can be responsible for addressing nodes and stations, as well as for transferring data packets between sub-networks. The IPv6 bus system can transfer nested control data from various network protocols according to a layered system structure. The IPv6 bus commands that are transmitted via the IPv6 bus system preferably contain the control commands that are to be transmitted, enveloped in the control data of various network protocols that are transmitted.

The operating device can have, for example, numerous output channels that can be controlled independently of one another for controlling lighting means in terms of different colors or color temperatures. The operating device can adjust the control of the output channels to the received color command.

The control commands can be transmitted, for example, according to the DALI standard or another digital protocol, or according to an analog protocol.

Further, control devices 11 acting as actuators can also transmit control commands.

Figure 2:
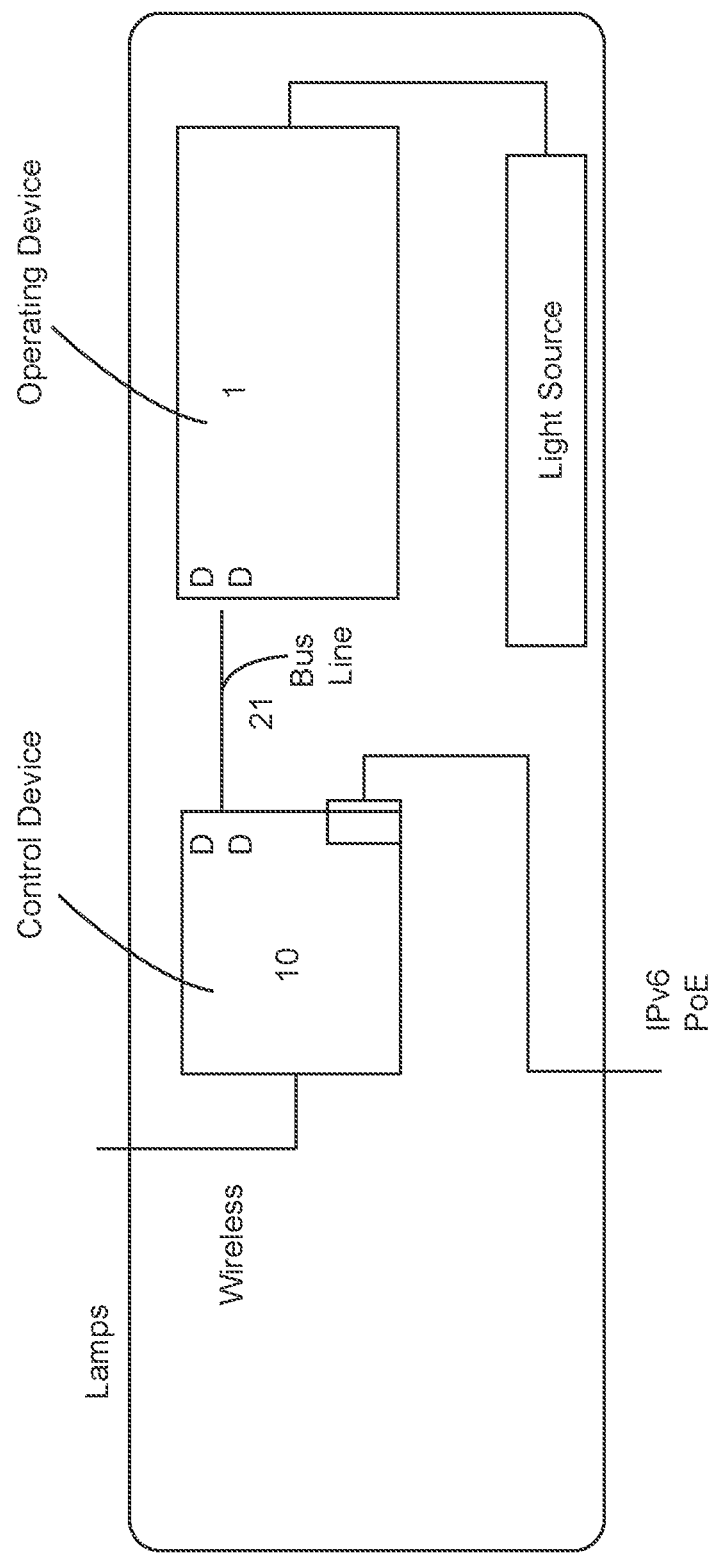
FIG. 2 shows, schematically, the design of a lighting system having a control device according to the invention.

FIG. 2 shows, by way of example, a lighting system A having at least one operating device 1 for operating lighting means (light sources), and having a control device 10. The operating device receives digital control commands from the control device 10. The operating device 1 is controlled by the control device 10 via control commands in terms of brightness and color.

The control device is connected to an IPv6 bus system. The control device 10 is configured to receive IPv6 bus commands via the IPv6 bus system. The control device 10 transmits a color command or a brightness command as a control command to the at least one operating device 1 in accordance with the received IPv6 bus command. The operating device 1 adjusts the control of the lighting means in accordance with the received color command or brightness command. The control commands, e.g. color commands or brightness commands, can be transmitted, nested in Iv6 bus commands, wherein these control commands are transmitted in accordance with a layered system structure inside the control data of various network protocols. The control device evaluates the IPv6 bus commands and reads out the control commands contained therein. The control device can thus transfer the control commands contained in the IPv6 bus commands to the bus line 21. The operating device can optionally have numerous independently controllable output channels for controlling lighting means in terms of different colors or color temperatures, and the operating device can adjust the control of the output channels to the received color command or brightness command.

A sensor, e.g. a movement sensor or an external light sensor, can be connected to the bus line 21. An external light sensor can be disposed, for example, outside a building that is to be illuminated by means of the lighting system. The external light sensor 15 can be disposed, for example, such that it only detects the light outside a building that is to be illuminated by means of the lighting system. By way of example, it can be disposed with its detection range, such that it only detects the exterior light through a window.

The exterior light sensor can be an RGBW sensor, for example, e.g. TCS3472 from TAOS. These types of sensors offer the possibility of evaluating the color channels RGB and W (red, green, blue and white) individually. In this manner, it is possible to detect and evaluate the color or color temperature of the exterior light.

The invention also relates to a control device 10 for controlling light operating devices 1, which transmits analog or digital control commands to the operating devices. The operating devices 1 are controlled in terms of brightness and color via control commands, wherein the control device is furthermore connected to an IPv6 bus system. The control device 10 is configured to receive IPv6 bus commands via the IPv6 bus system, and is furthermore configured to transmit a color command or a brightness command as a control command to at least one operating device in accordance with the received IPv6 bus command. The operating device 1 is also configured to adjust the control of the lighting means in accordance with the received color command or brightness command.

The control device 10 can be designed to receive IPv6 bus commands via a wireless and/or wire-connected IPv6 bus system. The wireless IPv6 bus system can be a WLAN data connection, for example. The control device can be designed for an alternative or parallel connection to a wireless and wire-connected IPv6 bus system. In order to connect it to a wireless IPv6 bus system, the control device 10 can have an antenna, or can be connected to an antenna. In order to connect it to a wire-connected IPv6 bus system, the control device 10 can have a port for an Ethernet connection, e.g. a CAT 45 port.

The control device 10 can be designed to provide the voltage supply for the analog or digital light control bus, preferably supplied by the IPv6 bus system. A power supply for the control device 10 and the actuator control devices 11 can thus occur starting from the IPv6 bus system.

By way of example, a low-voltage converter, e.g. a high frequency, clocked, direct voltage converter is disposed in the control device, which provides a supply voltage to the bus line 21 from the voltage supplied to the IPv6 bus system. With DALI, this can be a voltage of ca. 16 volts for the maximum level, for example. The IPv6 bus system can be designed as a PoE connection (Power over Ethernet), for example, and thus, both data, as well as the power for the power supply for the bus line, can be transmitted via the connection. By way of example, the voltage of the IPv6 bus system can be reduced from 48V DC for the maximum level to a voltage of 16V DC for the maximum level.

The control device 10 can furthermore be designed to detect the load, in particular the current consumption, of the bus line 21. By way of example, the control device 10 can be designed such that it detects the current supplied to the bus line 21 directly or indirectly. When the voltage at the bus line 21 is known, which can be measured, for example, or may be known due to a setting for the low-voltage converter, the control device 10 can thus discern the activity of the operating device 1 connected to the bus line 21 for lighting means as well as actuator control devices 11. Typically, the operating devices 1 for lighting means as well as the actuator control devices 11 connected to the bus line 21 obtain a supply current for supplying their internal interface circuits. According to the DALI standard, the light operating devices 1 connected to the bus line 21 can receive a current of 2 mA, for example. The operating devices 1 frequently shut off their internal interface circuits when the lighting means connected to the operating devices 1 are switched off, and thus the operating devices 1 are also deactivated.

When the number of devices connected to the bus line 21 is known, thus the number of light operating devices 1, and optionally actuator control devices 11, the control device 10 can detect when all of the operating devices 1 and/or actuator control devices 11 have been switched off by monitoring the load to the bus line 21.

Alternatively or additionally, the control device 10 can also monitor and evaluate the control commands transmitted via the bus line 21. Based on this evaluation, the control device 10 can detect when all of the operating devices 1 have received a switching off command. This can be the case, for example, at night in an office building or shopping center.

If the control device 10 detects that all of the operating devices 1 and/or actuator control devices 11 have been switched off, a supply voltage for supplying the bus line 21 can at least be temporarily shut off. A type of sleep mode can also be set, in which provision of a supply voltage for supplying the bus line 21 is at least interrupted for longer periods of time, wherein, the provision of a supply voltage for supplying the bus line 21 is briefly activated at regular intervals, e.g. at spacings of a few minutes. In these phases of the brief activation of the provision of a supply voltage for supplying the bus line 21, the control device 10 can query the operating devices 1 for lighting means and/or actuator control devices 11 connected thereto, whether a change has occurred, and whether a long-term activation, for example, through switching the lighting means back on, is necessary.

Alternatively or additionally, the control device 10 can also be designed to disengage the operating devices 1 from the network when it has been detected that all of the operating devices 1 connected to the bus line 21 have been switched off, e.g. based on a monitoring of the control commands. In this case, the control device 10 is preferably equipped with a relay, or connected to a relay 5, which can disengage the operating devices 1 from the network via a safeguard. In this case, the network voltage supply of the operating devices 1 of e.g. 230V AC is interrupted by the control device 10. The disengagement and coupling of the operating devices 1 from and to the network supply can also occur by means of a semiconductor switch, for example, instead of the relay 5.

The separation of the operating devices 1 from the network when it has been detected that the lighting means has been switched off can also occur, for example, while retaining the supply to the bus line 21 by the control device 10. In this case, it would be possible to keep the actuator control device 11 and the operating device 1 in operation, at least to the extent that they can maintain communication on the bus line 21, and optionally can transmit a command to switch it back on. In the case of a switching-on command on the bus line 21, or on an IPv6 bus system as well, the control device 10 could re-couple the operating devices 1 to the network, and subsequently the operating devices 1 could again supply and operate the lighting means from the network.

The control device 10 can be designed to receive control commands on the analog or digital light control bus, and furthermore, to relay the control commands received on the light control bus to the IPv6 bus system.

A switching-off command can be a control command for obtaining a brightness value of 0, for example, but it can also be a control command for the selective deactivation of individual operating devices 1.

The power supply for the control device 10 and the control devices 11 can alternatively occur via a bus supply 12. The bus supply 12 can supply the bus line 21 thereby, in that a transfer according to the so-called "active low" principle is used. With such a transfer, there is permanent level of e.g. 12V or 16V, as long as no data is transferred. With a data transfer, the level for transferring one bit is drawn at a level of less than, e.g., 2V. In this manner, a permanent voltage exists on the bus line, and thus it is possible to supply the control devices 10 and 11 via the bus line 21.

Alternatively, the control device 10 may have its own power supply, which is coupled directly to the network supply.

The control device 10 can query the status of the operating devices 1 via the bus line 21. Furthermore, the control device 10 can also be configured and controlled directly by a user via buttons or switches connected directly thereto, by means of an interface to a programming device, by means of a touchscreen or by other interaction means. The user can also enter control commands such as brightness values, for example, by means of the direct control possibility.

In order to enable a simple installation of the control device 10, the control device 10 can be accommodated in a DIN busbar housing.

What is claimed is:

1. A method for controlling a lighting system (A) having a bus line (21), comprising an analog or digital light control bus, to which at least one operating device (1) for operating lighting means and at least one control device (10) are connected, wherein the at least one operating device (1) is being controlled via control commands in terms of the brightness and/or color transmitted on the light control bus, and wherein the control device is connected to an IPv6 bus system, the method comprising the following steps:
   receiving IPv6 bus commands in the control device (10) via the IPv6 bus system,
   converting the received IPv6 bus commands in the control device 10,
   transmitting a color command or brightness command as a control command from the control device 10 to at least one operating device (1),
   adjusting the control of the lighting means by the operating device 1 in accordance with the received color command or brightness command,
   supplying electrical power to the control device (10) from the IPv6 bus system, and
   providing electrical power from the IPv6 bus system through the control device to the light control bus (21) and the at least one operating device (1).

2. The method according to claim 1, wherein the control commands are transferred, nested inside IPv6 bus commands.

3. The method according to claim 2, wherein the control device evaluates the IPv6 bus commands and relays the control commands contained therein to the bus line (21).

4. The method according to claim 1,
   wherein the operating device (1) has numerous independently controllable output channels for controlling lighting means with different colors or color temperatures, and the operating device (1) adjusts the control of the output channels in accordance with the received color command or brightness command.

5. The method according to claim 1 wherein the control commands are transmitted according to the DALI standard.

6. The method according to claim 1 wherein the IPv6 bus commands are transmitted via a wire-connected IPv6 bus system.

7. The method according to claim 1 wherein the control device (10) disengages the operating devices (1) from the network when all of the operating devices (1) connected to the bus line (21) have been detected as switched off.

8. A lighting system (A) comprising:
   at least one operating device (1) for operating lighting means;
   a light control bus (21);
   a control device (10), which is connected to the operating device via a the light control bus (21), and is configured to transmit analog or digital control commands via the light control bus to the at least one operating device (1), wherein the control device (10) is configured to control the operating devices (1) via the control commands in terms of the brightness and/or color;
   an IPv6 bus system to which the control device is connected wherein the control device (10) is configured to receive IPv6 bus commands via the IPv6 bus system, and further configured to transmit a color command or a brightness command as a control command over the light control bus (21) corresponding to a received IPv6 bus command to at least one operating device (1), and the at least one operating device (1) is configured to adjust the control of the lighting means in accordance with the received color command or brightness command;
   further wherein electrical power is supplied to the control device (10) from the IPv6 bus system, and through the control device (10) to the light control bus (21) and the at least one operating device (1).

9. The lighting system (A) according to claim 8, wherein the control device (10) is configured to receive IPv6 bus commands via a wire-connected IPv6 bus system.

10. The lighting system (A) according to claim 8, wherein the control commands are transferred, nested inside IPv6 bus commands.

11. The lighting system (A) according to claim 8, wherein the control device is configured to evaluate the IPv6 bus commands and to relay the control commands contained in the IPv6 bus commands to the bus line (21).

12. The lighting system (A) according to claim 8, wherein the control device (10) is configured to interrupt the provision of the voltage supply for the light control bus (21).

13. The lighting system (A) according to claim 8 wherein the control device (10) is configured to receive control commands on the light control bus (21), and furthermore to relay the control commands received on the light control bus to the IPv6 bus system.

14. A control device (10) for controlling operating devices (1) for lighting means, which is configured to be connected to the operating devices via a light control bus (21), and is configured to transmit analog or digital control commands via the light control bus (21), wherein the control device (10) is further configured to control the operating devices (1) via control commands in terms of the brightness and color, and the control device is connected to an IPv6 bus system and electrical power is supplied to the control device (10) from the IPv6 bus system and through the control device (10) to the light control bus (21) and the at least one operating device (1); and
   Further wherein the control device (10) is configured to receive IPv6 bus commands via the IPv6 bus system, and to transmit a color command or brightness command as a control command corresponding to the received IPv6 bus command to the at least one operating device.

15. The control device (10) according to claim 14 further comprising a voltage converter.

16. The control device (10) according to claim 15 wherein the voltage converter is a high-frequency, clocked direct voltage converter.

17. The control device (10) according to claim 14 wherein the IPv6 bus system has a Power over Ethernet (PoE) connection that connects to the control device.

18. The lighting system according to claim 8 wherein the control device (10) further comprises a voltage converter.

19. The lighting system according to claim 18 wherein the voltage converter is a high-frequency, clocked direct voltage converter.

20. The lighting system according to claim 8 wherein the IPv6 bus system has a Power over Ethernet (PoE) connection that connects to the control device.

\* \* \* \* \*